United States Patent
Toy

(10) Patent No.: US 12,241,720 B2
(45) Date of Patent: Mar. 4, 2025

(54) VIEWING OPTIC

(71) Applicant: Sheltered Wings, Inc., Barneveld, WI (US)

(72) Inventor: Seth Toy, Barneveld, WI (US)

(73) Assignee: Sheltered Wings, Inc., Barneveld, WI (US)

(*) Notice: Subject to any disclaimer, the term of this patent is extended or adjusted under 35 U.S.C. 154(b) by 0 days.

(21) Appl. No.: 17/512,909

(22) Filed: Oct. 28, 2021

(65) Prior Publication Data

US 2022/0136802 A1    May 5, 2022

Related U.S. Application Data

(60) Provisional application No. 63/107,087, filed on Oct. 29, 2020.

(51) Int. Cl.
     *F41G 1/30*    (2006.01)
     *G02B 27/02*    (2006.01)

(52) U.S. Cl.
     CPC ............. *F41G 1/30* (2013.01); *G02B 27/028* (2013.01)

(58) Field of Classification Search
     CPC .......................................................... F41G 1/30
     USPC .......................................................... 42/113
     See application file for complete search history.

(56) References Cited

U.S. PATENT DOCUMENTS

| | | | |
|---|---|---|---|
| 7,234,265 B1 * | 6/2007 | Cheng | F41G 1/345 42/131 |
| D847,292 S * | 4/2019 | Hoff | D22/109 |
| 2011/0283589 A1 * | 11/2011 | Matthews | F41G 1/30 42/113 |
| 2013/0219767 A1 * | 8/2013 | Peterson | F41G 11/003 29/428 |
| 2016/0102943 A1 * | 4/2016 | Teetzel | F41G 1/35 42/113 |
| 2016/0327366 A1 * | 11/2016 | Campean | F41G 1/16 |
| 2017/0059278 A1 * | 3/2017 | Hartman | F41G 1/30 |
| 2019/0360777 A1 * | 11/2019 | Grace | F41G 1/345 |
| 2020/0025516 A1 * | 1/2020 | Mok | F41G 1/30 |
| 2020/0271419 A1 * | 8/2020 | Grace | F41G 1/545 |
| 2020/0278177 A1 * | 9/2020 | Grace | F41G 1/30 |
| 2021/0207928 A1 * | 7/2021 | Brewer | F41G 1/16 |
| 2021/0293510 A1 * | 9/2021 | Rosen | F41G 1/30 |
| 2022/0034629 A1 * | 2/2022 | Hamilton | F41G 1/30 |
| 2022/0244020 A1 * | 8/2022 | Morell | F41G 1/345 |

OTHER PUBLICATIONS

International Search Report and Written Opinion issued for International Patent Application No. PCT/US2021/056993 dated Jan. 27, 2022, 11 pages.

* cited by examiner

*Primary Examiner* — Samir Abdosh
(74) *Attorney, Agent, or Firm* — Husch Blackwell LLP

(57) ABSTRACT

A viewing optic has a housing. The base of the housing has a front side, a rear side, a left side and a right side which together define an upper surface. A first control is positioned on the left side of the base. A second control is positioned on the right side of the base.

11 Claims, 2 Drawing Sheets

VIEWING OPTIC

CROSS-REFERENCE TO RELATED APPLICATIONS

This application is a non-provisional application of and claims priority to U.S. Provisional Patent Application No. 63/107,087 filed Oct. 29, 2020, which is incorporated herein in its entirety.

FIELD

The disclosure relates to a viewing optics. In one embodiment, the disclosure relates to a mini red dot sight for a firearm.

BACKGROUND

Mini red dot sights (MRDSs) are non-magnifying reflector sights generally used with small firearms such as handguns and pistols. MRDSs use a reflective optical system to project light toward the user to see the target field and the illuminated red dot reticle. MRDSs can be either enclosed, in which all of the optical elements are completely encased by a housing, or open, in which at least a portion of the optical elements are not encased by a housing.

Controls for MRDSs are generally provided on one of the sides of the housing or top of the base of the MRDSs. These controls generally allow a user to adjust the brightness of the MRDS. Control location is very important. Controls should be quickly and easily accessible to a shooter in a variety of situations. When positioned on a side of the housing, the controls tend to favor right- or left-handed shooters, depending on which side the controls are on. Furthermore, controls can be blocked or inaccessible when a small firearm is holstered, making adjustments before drawing a firearm near impossible. While controls on the top of the base make for an ambidextrous MRDS, the space provided to reach the controls is limited, making it difficult to adjust the controls when wearing gloves. Because of the open MRDS's design, a user's finger will also block the emitter when using the controls. A user therefore cannot observe the brightness of the MRDS during adjustment.

For the reasons discussed above, having controls positioned on a MRDS housing which provide ambidextrous control and do not cause the emitter to be obscured during adjustment is a big advantage. Similarly, having controls that are accessible while a firearm is holstered is a big advantage. Thus, there is a large need for a mounting system that can address these concerns.

SUMMARY

In one embodiment, the disclosure provides a viewing optic. In accordance with embodiments of the present disclosure, a viewing optic comprises a housing having a base containing a front side, a rear side, a left side, and a right side and defining an upper surface; a first control positioned on the left side of the base; and a second control positioned on the right side of the base.

In an embodiment, the first and second controls are brightness controls. In a further embodiment, each of the first and second control comprises at least two adjustment means. In such an embodiment, the at least two adjustment means are depressible buttons. In yet a further embodiment, the left side and right side of the base each includes a recess and the first control and second control are contained within a respective recess. In another embodiment, each control comprises a portion of an elastomeric material.

In one embodiment, the viewing optic is a mini red dot sight, or more specifically an open mini red dot sight.

In another embodiment, the disclosure provides a firearm. In accordance with embodiments of the present disclosure, a firearm comprises a viewing optic, the viewing optic having a housing having a base containing a front side, a rear side, a left side, and a right side, and defining an upper surface; a first control positioned on the left side of the base; and a second control positioned on the right side of the base.

In an embodiment, the viewing optic is a mini red dot sight, and preferably an open mini red dot sight. In an embodiment, the firearm is a handgun.

In an embodiment, the first and second controls each comprise at least two adjustment means. In a further embodiment, the at least two adjustment means are depressible buttons. In an embodiment, the left and right side of the base each include a recess and the first and second control are contained within a respective recess. In another embodiment, each control comprises a portion of an elastomeric material.

BRIEF DESCRIPTION OF THE DRAWINGS

Embodiments of the disclosure are disclosed with reference to the accompanying drawings and are for illustrative purposes only. The disclosure is not limited in its application to the details of construction or the arrangement of the components illustrated in the drawings. The disclosure is capable of other embodiments or of being practiced or carried out in other various ways. Like reference numerals are used to indicate like components. In the drawings.

Figure 1:
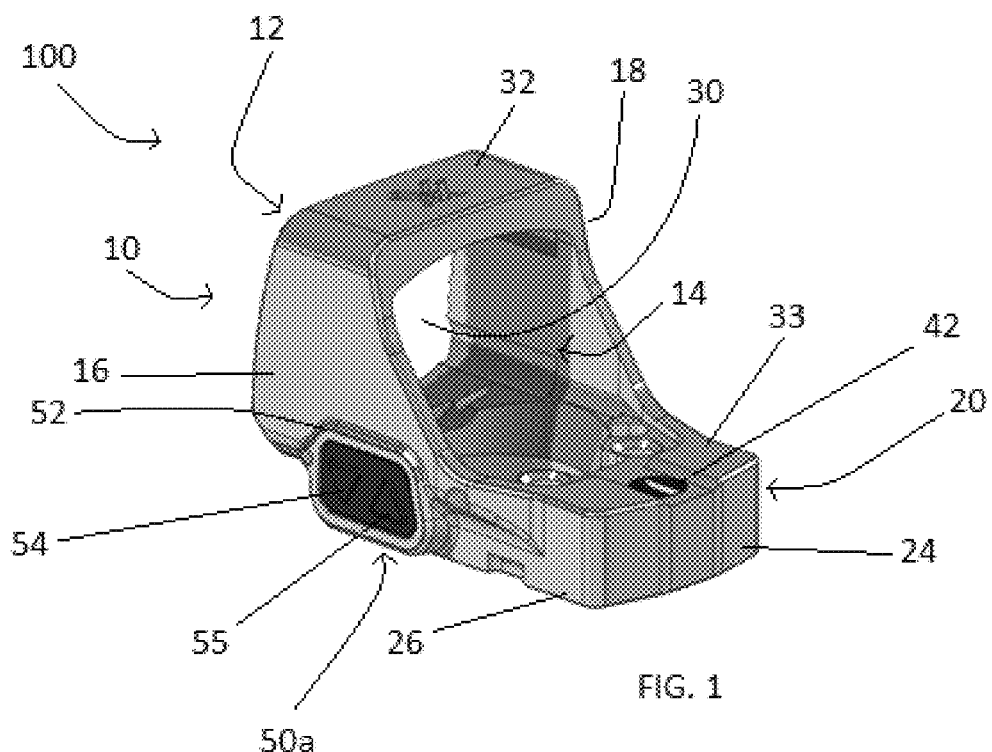
FIG. 1 is a left side perspective view of a mini red dot sight in accordance with embodiments of the present disclosure.
Figure 2:
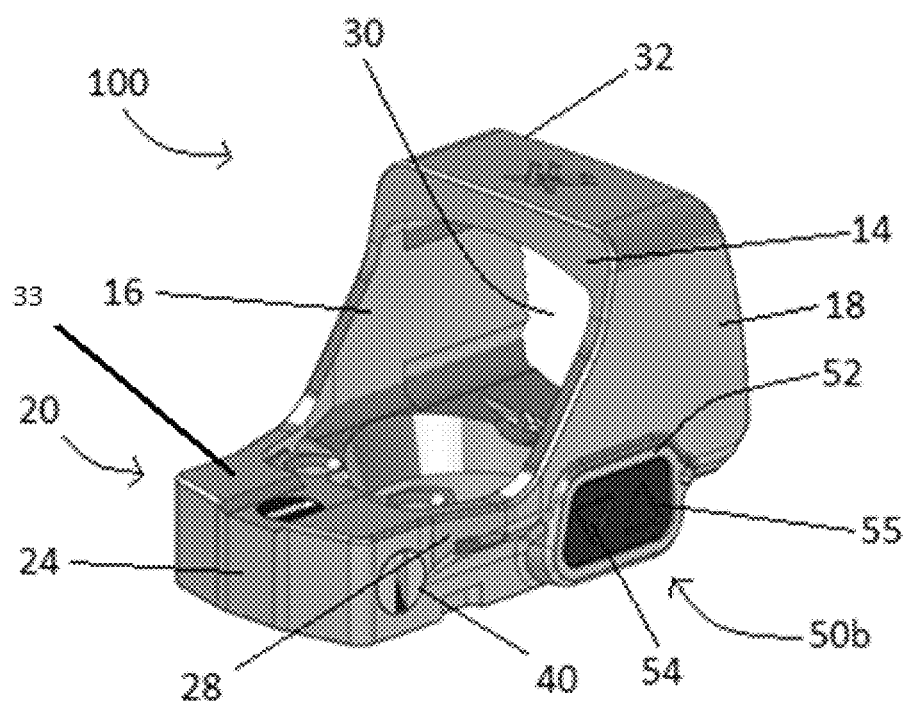
FIG. 2 is a right side perspective view thereof.

Before explaining embodiments of the disclosure in detail, it is to be understood that the disclosure is not limited in its application to the details of construction and the arrangement of the components set forth in the following description or illustrated in the drawings. The technology of this present disclosure is capable of other embodiments or being practiced or carried out in various ways. Also, it is to be understood that the phraseology and terminology employed herein is for the purpose of description and should not be regarded as limiting.

DETAILED DESCRIPTION

The numerical ranges in this disclosure are approximate, and thus may include values outside of the range unless otherwise indicated. Numerical ranges include all values from and including the lower and the upper values, in increments of one unit, provided that there is a separation of at least two units between any lower value and any higher value. As an example, if a compositional, physical or other property, such as, for example, molecular weight, melt index, temperature, etc., is from 100 to 1,000, it is intended that all individual values, such as 100, 101, 102, etc., and sub ranges, such as 100 to 144, 155 to 170, 197 to 200, etc., are expressly enumerated. For ranges containing values which are less than one or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this disclosure. Numerical ranges are provided within this disclosure for, among other things, relative amounts of components in a mixture, and various temperature and other parameter ranges recited in the methods.

FIGS. 1-4 illustrate a viewing optic 100, in accordance with embodiments of the present disclosure. In the particular embodiment shown, the viewing optic 100 is an mini red dot sight (MRDS), and for purposes of this disclosure "viewing optic" and "MRDS" may be used interchangeably. When mounted to a firearm, the viewing optic 100 displays a reticle to facilitate alignment of a trajectory of the firearm with a target.

In the embodiment shown, the MRDS 100 has a housing 10 and a base 20. The housing 100 has a front side 12, rear side 14, left side 16, right side 18 and top side 32. The front side 12, rear side 14, left side 16, and right side 18 extend generally upwardly from the base 20. The front side 12 and rear side 14 extend between the left side 16 and right side 18. The top side 32 extends between the upper edges of each of the front side 12, rear side 14, left side 16, and right side 18. The resulting housing 10 contains the illumination system and other components which make the viewing optic functional at least in part. That is, in the embodiment shown, the MRDS 100 is shown as an open MRDS, meaning a portion of the light path of the MRDS is exposed. In this embodiment, a lens 30 is contained in the front side 12, with no further lens or cover at the rear of the housing 10. However, in further embodiments, the MRDS is a closed MRDS in which the entire light path is enclosed and a lens or cover is provided at the rear side of the housing. A plurality of screws, such as a mounting screw 40 and various adjustment screws 42, are provided at the base 20 of the housing 10. A battery (not shown) is also secured in the housing 10.

Figure 3:
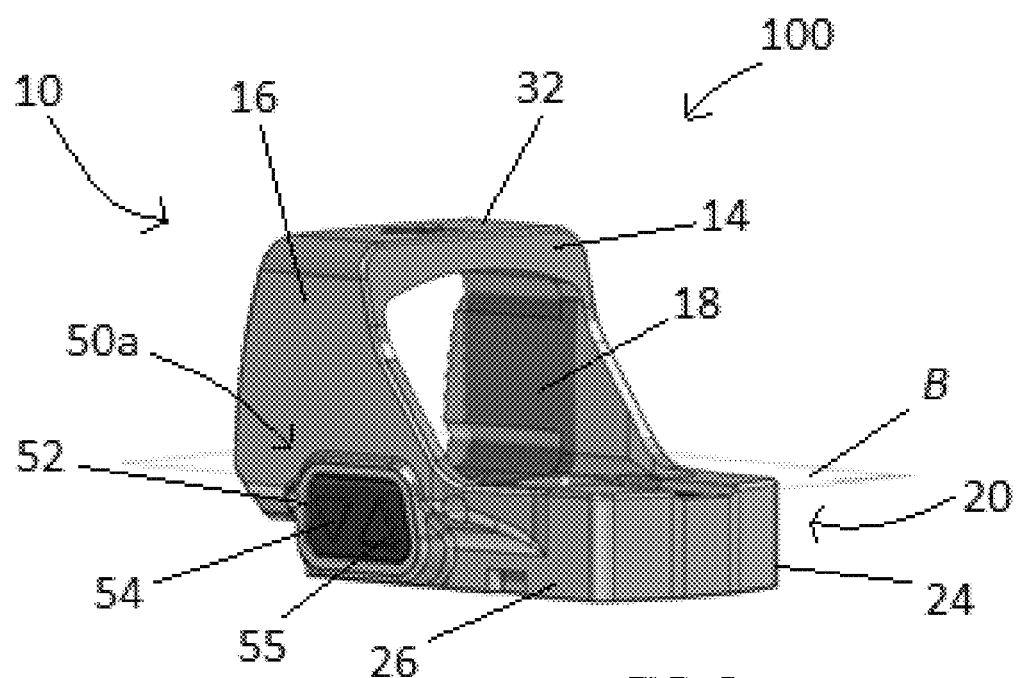
FIG. 3 is a further left side perspective view showing the upper plane of the base in accordance with embodiments of the present disclosure.
Figure 4:
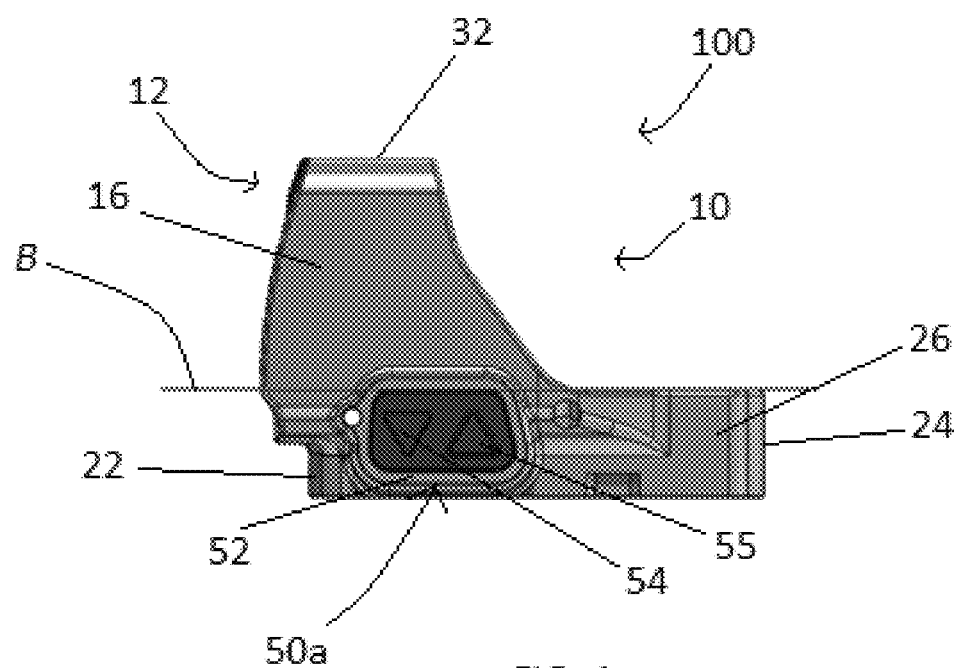
FIG. 4 is a left side view thereof.

Turning specifically to the base 20, the base 20 has a front side 22, rear side 24, left side 26, right side 28 and upper surface 33. As shown in FIGS. 3 and 4, the upper surface 33 of the base 20 occurs along the plane B, with each of the sides 22, 24, 26, 28 occurring below the plane B and not extending above the plane B. As such, the left side 16 and right side 18 of the housing appear as legs extending upward from the left side 26 and right side 28 of the base, respectively.

As shown with reference to FIGS. 1-4, the controls 50a and 50b are positioned on the left side 26 and right side 28 of the base 20. While the contour 52 of the base 20 which forms the depression or recess into which the controls 50a, 50b are recessed may extend beyond the plane B, the functional portions of the controls 50a, 50b are entirely positioned below the plane B so as to be on the base 20 of the MRDS 100. In the embodiment shown, each of the controls 50a, 50b is provided as two depressible buttons 54, 55. In a particular embodiment, one of the two depressible buttons (that is, button 54 or button 55) is configured to increase the brightness of the MRDS 100 and the other is configured to decrease the brightness of the MRDS 100. Moreover, in the particular embodiment shown, both controls 50a, 50b are identical, meaning they control the same property of the MRDS in the same manner. However, in further embodiments, the controls 50a, 50b may be any type of adjustment means or combination of adjustment means, such as, for example, depressible buttons, toggles, knobs, slides, etc. Further, the control 50 may include any number of such adjustment means, including but not limited to a single control, or more than two controls. Similarly, one or more of the controls 50a, 50b may be configured to adjust a property of the MRDS other than brightness, and the controls 50a, 50b may be configured to control different properties.

In an embodiment, the controls 50a, 50b comprise a portion of elastomeric material, or rubber-like material. As shown in the Figures, in such an embodiment, the controls 50a, 50b each comprise a portion of a rubber or silicone material contained a contour 52 on a respective side 26, 28 of the base 20. It will be appreciated that the recesses contain the mechanisms which are in electrical communication with the internal mechanisms that control the particular property being adjusted, which in the present embodiment is brightness.

By positioning controls 50a, 50b on both sides 26, 28 of the base 20, right-handed and left-handed users can equally utilize the MRDS without having to utilize a non-dominant hand. Furthermore, because the controls 50a, 50b as shown in the Figures each include two adjustment means, multiple directions of control or multiple properties may be adjusted with a single control 50a, 50b. This is in direct contrast to providing a single control on a side of the housing. Also, positioning the controls 50a, 50b on the sides 26, 28 of the base 20 ensures that the controls 50a, 50b are not blocked or crowded by other structures, allowing a user to easily access the controls 50a, 50b even while wearing gloves.

Positioning a control 50a, 50b on both sides 26, 28 of the base 20 of the housing 10 also allows a user to make adjustments with the firearm in its holster, which is not always possible with controls positioned on a single side of a MRDS. For example, if a competition shooter wants to make a brightness adjustment to compensate for some incoming cloud cover, the shooter is not able to remove the firearm from the holster to make this adjustment per the rules of the match, but would still be able to make the adjustment with the MRDS 100 disclosed herein.

Another environment in which ambidextrous control of an MRDS 100 is beneficial is when the MRDS is mounted offset, such as at a 45-degree angle, when used alongside a primary optic. If controls are provided on only a single side of the base 20, the control will be obscured if on the same side as the primary optic. The present MRDS 100, with controls 50a, 50b on each side 26, 28 of the base 20, allows the MRDS 100 to be used on either side of a primary optic.

Although the mounting system is described with reference to a MRDS, a variety of other viewing optics may be provided with controls on a top surface, as describe herein. As used herein, the term "viewing optic" refers to an apparatus used by a shooter or a spotter to select, identify or monitor a target. The "viewing optic" may rely on visual observation of the target, or, for example, on infrared (IR), ultraviolet (UV), radar, thermal, microwave, or magnetic imaging, radiation including X-ray, gamma ray, isotope and particle radiation, night vision, vibrational receptors including ultra-sound, sound pulse, sonar, seismic vibrations, magnetic resonance, gravitational receptors, broadcast frequencies including radio wave, television and cellular receptors, or other image of the target. The image of the target presented to the shooter by the "viewing optic" device may be unaltered, or it may be enhanced, for example, by magnification, amplification, subtraction, superimposition, filtration, stabilization, template matching, or other means.

The target selected, identified or monitored by the "viewing optic" may be within the line of sight of the shooter, or tangential to the sight of the shooter, or the shooter's line of sight may be obstructed while the target acquisition device presents a focused image of the target to the shooter. The image of the target acquired by the "viewing optic" may be, for example, analog or digital, and shared, stored, archived, or transmitted within a network of one or more shooters and spotters by, for example, video, physical cable or wire, IR, radio wave, cellular connections, laser pulse, optical, 802.11b or other wireless transmission using, for example, protocols such as html, SML, SOAP, X.25, SNA, etc., Bluetooth™, Serial, USB or other suitable image distribution method. In one embodiment, the viewing optic is a MRDS, and more particularly an open MRDS.

While various embodiments of the MRDS have been described in detail, it should be apparent that modifications and variations thereto are possible, all of which fall within the true spirit and scope of the invention. With respect to the above description then, it is to be realized that the optimum dimensional relationships for the parts of the disclosed technology, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A viewing optic comprising:
   a housing having a base, the base having a front side, a rear side, a left side, and a right side and an upper surface, the upper surface of the base occurring along a plane, the front side, the rear side, the left side and the right side occurring below the plane and not extending above the plane;
   a first control positioned in a first recess on the left, front side of the base, the first control having at least two adjustment mechanisms, wherein the first recess occurs below the plane and does not extend above the plane; and
   a second control positioned in a second recess on the right, front side of the base, the second control having at least two adjustment mechanisms, wherein the second recess occurs below the plane and does not extend above the plane, and further wherein the first control and the second control are brightness controls.

2. The viewing optic of claim 1, wherein the at least two adjustment means are depressible buttons.

3. The viewing optic of claim 1, wherein each control comprises a portion of an elastomeric material.

4. The viewing optic of claim 1, wherein the viewing optic is a mini red dot sight.

5. The viewing optic of claim 4, wherein the mini red dot sight is an open mini red dot sight.

6. A firearm comprising:
   a viewing optic, the viewing optic having
      a housing having a base, the base having a front side, a rear side, a left side, and a right side and an upper surface, the upper surface of the base occurring along a plane, the front side, the rear side, the left side and the right side occurring below the plane and not extending above the plane;
      a first control positioned in a first recess on the left, front side of the base, the first control having at least two adjustment mechanisms, wherein the first recess occurs below the plane and does not extend above the plane; and
      a second control positioned in a second recess on the right, front side of the base, the second control having at least two adjustment mechanisms, wherein the second recess occurs below the plane and does not extend above the plane, and further wherein the first control and the second control are brightness controls.

7. The firearm of claim 6, wherein the viewing optic is a mini red dot sight.

8. The firearm of claim 7, wherein the viewing optic is an open mini red dot sight.

9. The firearm of claim 6, wherein the firearm is a handgun.

10. The firearm of claim 6, wherein the at least two adjustment means are depressible buttons.

11. The firearm of claim 6, wherein each control comprises a portion of an elastomeric material.

* * * * *